United States Patent [19]
Garrett

[11] Patent Number: 5,381,650
[45] Date of Patent: Jan. 17, 1995

[54] SWIVEL HARDWARE ASSEMBLY
[75] Inventor: Charles R. Garrett, Ramona, Okla.
[73] Assignee: The Crosby Group, Inc., Tulsa, Okla.
[21] Appl. No.: 155,489
[22] Filed: Nov. 22, 1993
[51] Int. Cl.6 ............................................. F16G 15/08
[52] U.S. Cl. ........................................... 59/95; 403/78
[58] Field of Search ...................... 59/95; 403/165, 78

[56] References Cited
U.S. PATENT DOCUMENTS

| | | | |
|---|---|---|---|
| 1,927,367 | 9/1933 | Heale et al. | 59/95 |
| 2,318,119 | 5/1943 | Westhaver | 403/78 |
| 2,594,950 | 4/1952 | Madder | 59/95 |
| 2,860,908 | 11/1958 | Peterson . | |
| 3,179,376 | 4/1965 | Botten . | |
| 3,194,598 | 7/1965 | Goldfuss . | |
| 3,433,522 | 3/1969 | Raschke . | |
| 3,511,527 | 5/1970 | Gower . | |
| 4,074,519 | 2/1978 | Garrett . | |
| 4,552,481 | 11/1985 | Bluett | 59/95 |
| 4,575,429 | 3/1986 | Jacobson . | |
| 4,600,331 | 7/1986 | Gray | 59/95 |
| 4,867,889 | 9/1989 | Jacobson . | |

FOREIGN PATENT DOCUMENTS 1553080  9/1979  United Kingdom ................ 59/95

Primary Examiner—David Jones
Attorney, Agent, or Firm—Kirkpatrick & Lockhart

[57] ABSTRACT

A swivel hardware assembly which includes a bail having a base with an opening therethrough. A shank, terminating in a head, passes through the opening to form a pivotal connection between the bail and the shank. The first thrust washer is juxtaposed between the head and the base. A second thrust washer is juxtaposed between the head and the base. Each thrust washer has at least one surface covered with a self lubricating material, the self lubricating surfaces mating with each other to form a bearing surface.

7 Claims, 4 Drawing Sheets

| TIME | TEMP. | TORQUE |
|---|---|---|
| 0 | 74 | 10 |
| 0.25 | 82 | |
| 0.5 | 87 | |
| 0.75 | 87 | |
| 1 | 90 | 10 |
| 1.25 | 93 | |
| 1.5 | 94 | |
| 1.75 | 94 | |
| 2 | 95 | 10 |
| 2.25 | 95 | |
| 2.5 | 95 | |
| 2.75 | 95 | |
| 3 | 95 | 15 |
| 3.25 | 95 | |
| 3.5 | 95 | |
| 3.75 | 95 | |
| 4 | 96 | 15 |
| 4.25 | 96 | |
| 4.5 | 106 | |
| 4.75 | 106 | |
| 5 | 106 | 15 |
| 5.25 | 106 | |
| 5.5 | 106 | |
| 5.75 | 106 | |
| 6 | 106 | 15 |
| 6.25 | 106 | |
| 6.5 | 107 | |
| 6.75 | 106 | |
| 7 | 106 | 15 |
| 7.25 | 107 | |
| 7.5 | 110 | |
| 7.75 | 110 | |
| 8 | 111 | 20 |

SWIVEL HARDWARE ASSEMBLY

BACKGROUND OF THE INVENTION

1. Field of the Invention

The present invention relates to a swivel hardware assembly for a load handling device. In particular, the present invention relates to a swivel hardware assembly having improved resistance to wear under heavy load situations.

2. Prior Art

Swivel hardware assemblies are used with a wide variety of load handling devices. These hardware assemblies are designed to connect rope, webbing or wire and support large working loads. Often times, the hardware assembly is composed of a pair of fittings, one fitting having an extending shank received through a circular opening of the other shank.

The hardware assembly allows a pivoting action between the fittings about the shank. The hardware assemblies are designed with great tensile strength so that working load limits may be up to thousands of pounds. Because of the longitudinal tensile forces, there exists bearing surfaces between the head of the shank and the base of the adjoining fitting.

Prior art includes swivels designed with needle, roller, and ball bearings. These are subject to higher costs and do not provide as good a life under the working loads of the swivels.

It is, therefore, a principal object and purpose of the present invention to provide a swivel hardware assembly having high load capacity, heat dissipation ability, and resistance to wear.

SUMMARY OF THE INVENTION

The present invention provides a swivel hardware assembly which may be utilized with various types of swivel hardware such as chain swivels, regular swivels, jaw end swivels and hook swivels.

The swivel hardware assembly includes a first load fitting such as a bail having a base. The base has a circular bore opening therethrough. A second load fitting, such as a jaw, has an extending shank which terminates in a head. The shank passes through and is received in the circular bore opening of the first load fitting. Accordingly, a pivotal connection is formed between the base of the first load fitting and the shank of the second load fitting.

A first thrust washer is juxtaposed between the head of the shank and the base. A second thrust washer is also juxtaposed between the head of the shank and the base. The first thrust washer and the second thrust washer each have a single flat surface covered with a self lubricating material.

The self lubricating surfaces face each other and mate with each other to form a bearing surface. When the swivel hardware assembly is subjected to pivotal movement, the first thrust washer will pivot or rotate along with and in response to movement of the shank and the head. The second thrust washer will move along with and in response to movement of the base of the bail. Accordingly, the self lubricating surfaces of the thrust washers will move with respect to each other.

DETAILED DESCRIPTION OF THE PREFERRED EMBODIMENTS

Figure 1:
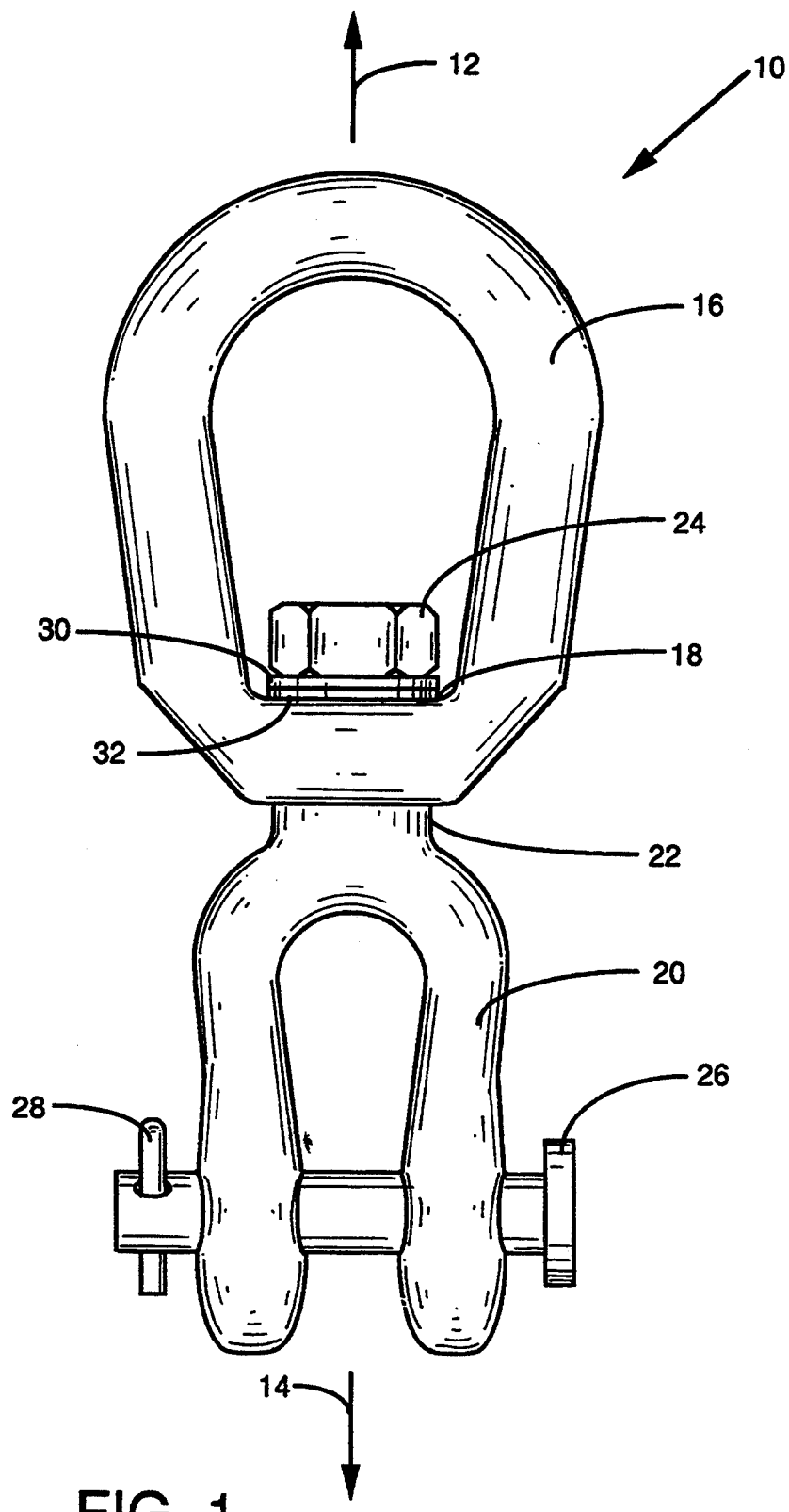
FIG. 1 is a perspective view of a swivel hardware assembly constructed in accordance with the present invention.

Referring to the drawings in detail, FIG. 1 is a perspective view of a swivel hardware assembly 10. The present embodiment shows the use of the present invention with a jaw and swivel arrangement. It will be understood, however, that the swivel hardware assembly of the present invention may also be utilized with various types of swivel hardware such as chain swivels, regular swivels having a bail on each end, hook swivels, and other configurations. In usage, the swivel 10 is subject to longitudinal tensile forces illustrated by arrows 12 and 14.

The swivel hardware assembly includes a first load fitting, such as a bail 16, having a base 18. The bail would be utilized to retain a chain, rope, webbing or the like. The base has a circular bore opening therethrough (not visible in FIG. 1).

A second load fitting such as a jaw 20 has an extending shank 22 which terminates in a head 24. The shank, cylindrical in shape, passes through and is received in the circular bore opening of the first load fitting to form a pivotal connection between the bail 16 of the first load fitting and the shank 22 of the second load fitting. The cylindrical shank will, thus, be permitted to rotate about its axis within the circular bore.

The jaw 20 includes a removable pin 26 held in place by a clip 28, cotter pin, or other means so that the pin 26 may be removed for installation or removal of a wire, rope, webbing or the like.

Figure 2:
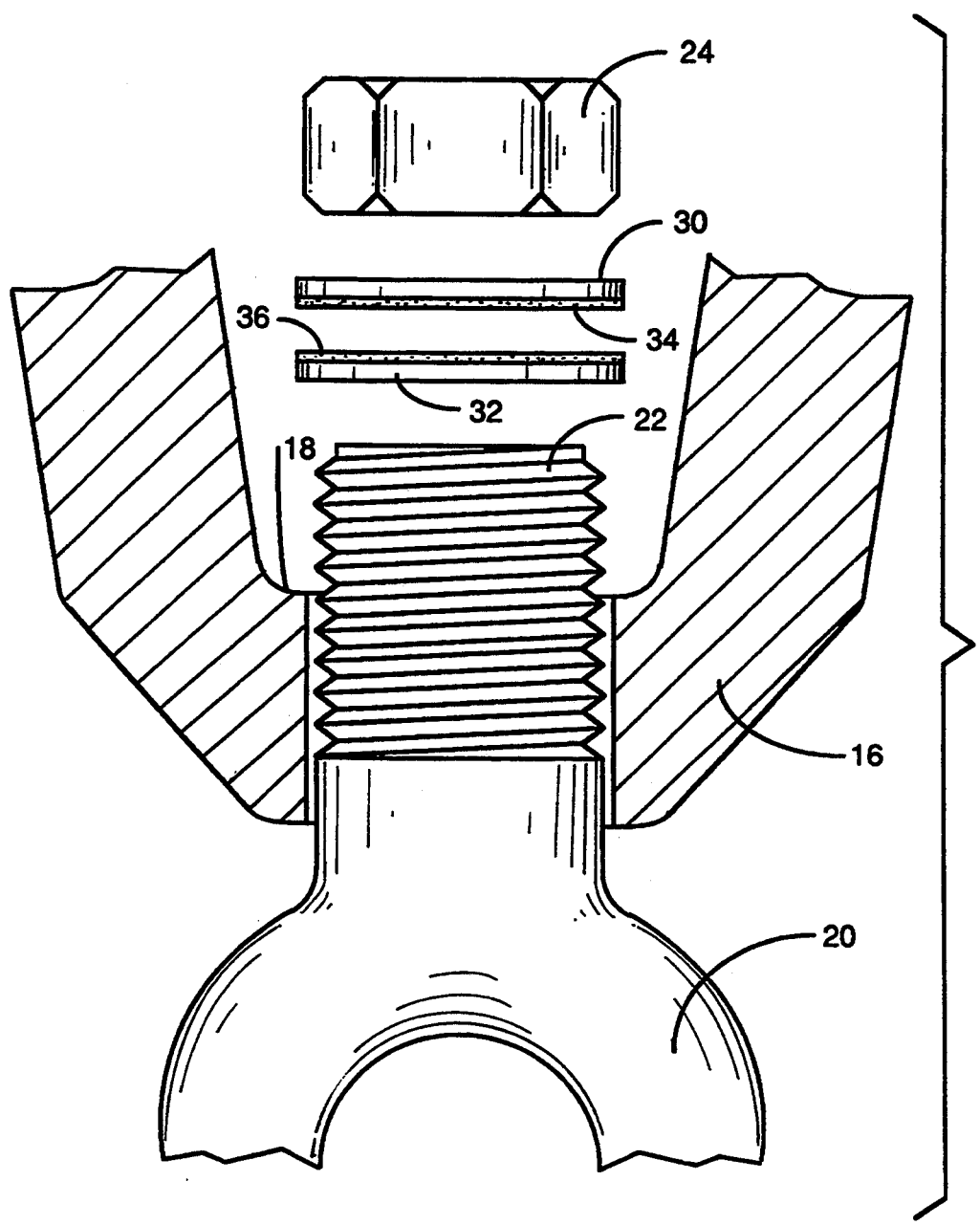
FIG. 2 is an exploded, partially sectioned view of the swivel hardware assembly shown in FIG. 1.

FIG. 2 is an exploded, partial view of the swivel hardware assembly shown in FIG. 1. Part of the bail including the base 18 are shown in sectional view for clarity. A first thrust washer 30 is juxtaposed between the head 24 of the shank 22 and the base 18. A second thrust washer 32 is juxtaposed between the head 24 and the base 18. The first thrust washer and the second thrust washer each have a single flat surface, 34 and 36, covered with a self lubricating material.

In the present embodiment, each thrust washer 30 and 32 includes a metal backing which is fabricated from steel, such as stainless steel, or other metals. A porous layer on the backing is comprised of a porous metal such as sintered bronze powder. The porous layer might alternately be composed of powdered aluminum or other alloys. The porous layer is caused to be sintered to result in a porous layer with good adhesion and laminated to the metallic backing layer.

A blend of low friction material is thereafter prepared.

The porous layer is impregnated with a mixture or blend including lead or a lubricating alloy of lead and a perfluorinated polymer such as polytetrafluoroethylene.

The porous layer is covered with an exterior layer comprised of a blend of lead or a lubricating alloy of lead such as a lead-tin alloy together with a perfluorinated polymer. The perfluorinated polymer may be any substantially fluorinated homopolymer or copolymer of polytetrafluoroethylene. The lead or lead alloy in the perfluorinated polymer are present in weight ratios between about 1.0 and 1.5 of lead or alloy to the polymer. The blend may further include about 1% to about 5% by weight of clay.

In the present invention, the self lubricating surfaces face each other and mate with each other to form a bearing surface. Since the mating surfaces are flush with each other, any tendency toward cavitation is avoided. The first thrust washer 30 will move along with and in response to the rotational movement of the shank 22 and head. The second thrust washer 32 will move along with and in response to movement of the base 18 of the bail. Accordingly, the thrust washers will move with respect to each other. It has been found that as the overlay or film of blend is depleted, the relative motion of the mating surfaces to each other continues to draw lubricating material from the porous bronze layer.

It has been found that the use of a pair of thrust washers 30 and 32 as employed in the present invention having self lubricating surfaces which face and mate with each other provides a great resistance to wear and increases the wear life.

The thin back to back washers reduce the physical dimensions normally required by bearings. Additionally, the back to back bearing application increases the load bearing capabilities, i.e., provides greater torque and longer bearing life than a single mounted bearing.

Testing was undertaken to compare the swivel hardware assembly 10 of the present invention with other design configurations. Each design configuration included a shank received in a circular bore. The following design arrangements were tested.

| Test | Hardware Assembly | Configuration |
| --- | --- | --- |
| 1 | Dual Bail Swivel | One self lubricating thrust washer with lubricating surface facing and mating with head of shank. |
| 2 | Dual Bail Swivel | One self lubricating thrust washer with lubricating surface facing and mating with head of shank. |
| 3 | Dual Bail Swivel | One hardened steel washer with one self lubricating thrust washer having lubricating surface facing the steel washer. |
| 4 | Dual Bail Swivel | Two hardened steel washers with a self lubricating washer sandwiched there between. |
| 5 | Bail and Hook Swivel | One hardened steel washer mating with neoprene washer. |
| 6 | Bail and Hook Swivel | One hardened steel washer and one self lubricating thrust washer with lubricating surface facing steel washer. |
| 7 | Bail and Hook Swivel | Two hardened steel washers with needle roller bearing therebetween. |
| 8 | Bail and Hook Swivel | One bronze washer. |
| 9 | Bail and Hook Swivel | No washer or other bearing. |
| 10 | Bail and Hook Swivel | One bronze washer with sprayed on lubricant. |
| 11 | Dual Bail Swivel | Two self lubricating thrust washers with facing/mating self lubricating surfaces. |
| 12 | Dual Bail Swivel | Two self lubricating thrust washers with facing/mating self lubricating surfaces. |

In order to perform each of the tests, a gearhead motor with a maximum output of 6 revolutions per minute (rpm) was mounted in a 55 ton fatigue testing machine. The output sprocket of the gearhead motor was connected to another larger sprocket which had been welded to a rotating body of a 25 ton Jaw and Eye swivel. The eye of the swivel was fixtured to the stationary crosshead of the fatigue machine. The test assemblies were then fixtured between the jaw end of the 25 ton swivel and the load ram of the 55 ton test machine. This resulted in an arrangement that rotated at 2.25 rpm while being subjected to a working load.

For each configuration tested, the procedure was as follows. The test assembly was initially loaded to a proof load of 14,400 lbs. After this proof loading, the assembly to be tested was loaded to 7200 lbs. and the breakaway rotational torque was measured. The temperature was taken at the base of the swivel bail before rotation of the load was started. After the loaded rotating testing was started, the temperature at the base of swivel bail was taken periodically at 15 minute intervals. Each hour, the rotating was stopped and the breakaway rotational torque was measured. Each test was stopped after six hours or at anytime prior thereto when it was obvious the tested swivel assembly was progressively deteriorating.

Figure 3:
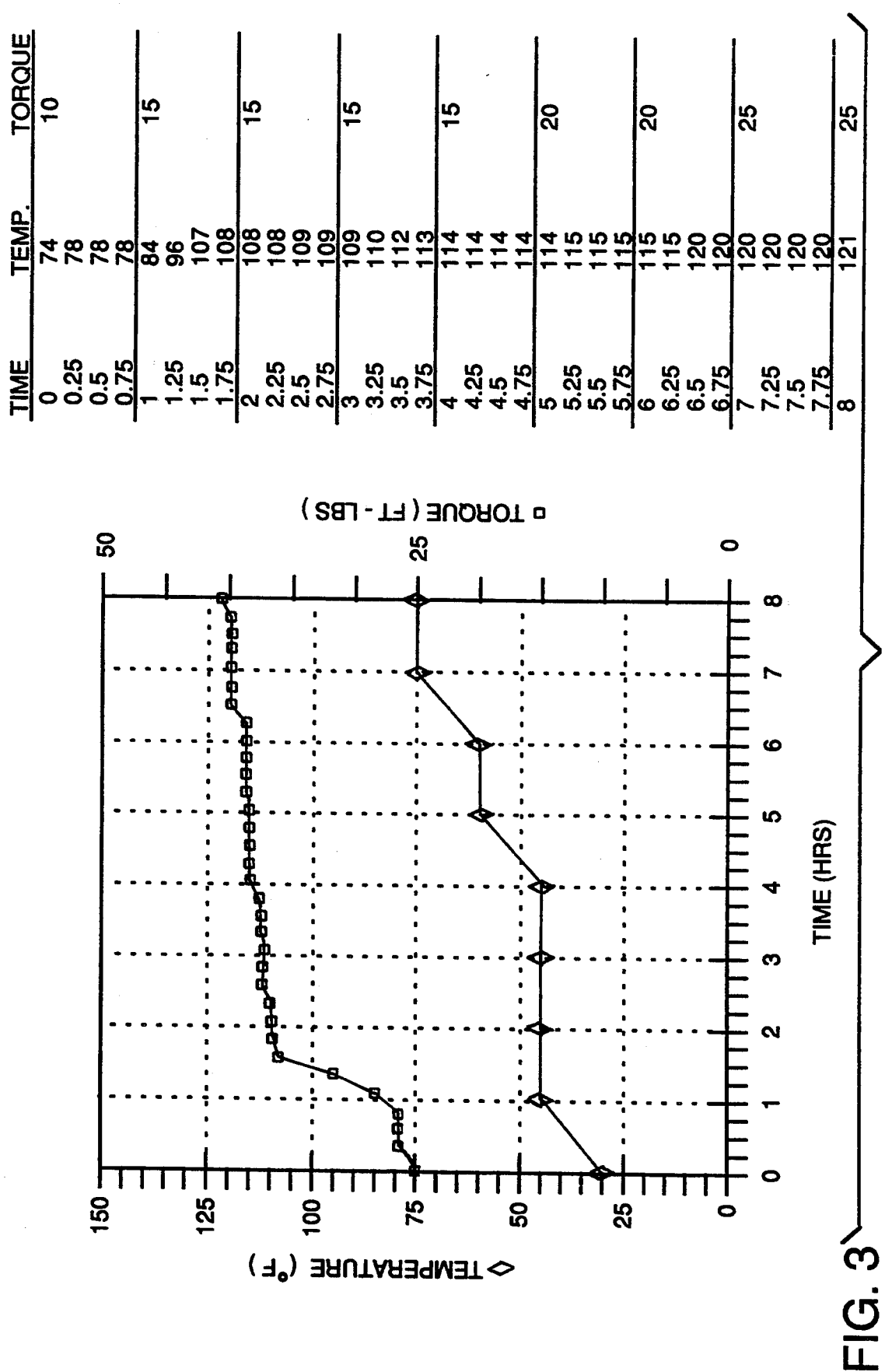
FIG. 3 is a chart showing the results of testing conducted on the swivel hardware assembly of the present invention.
Figure 4:
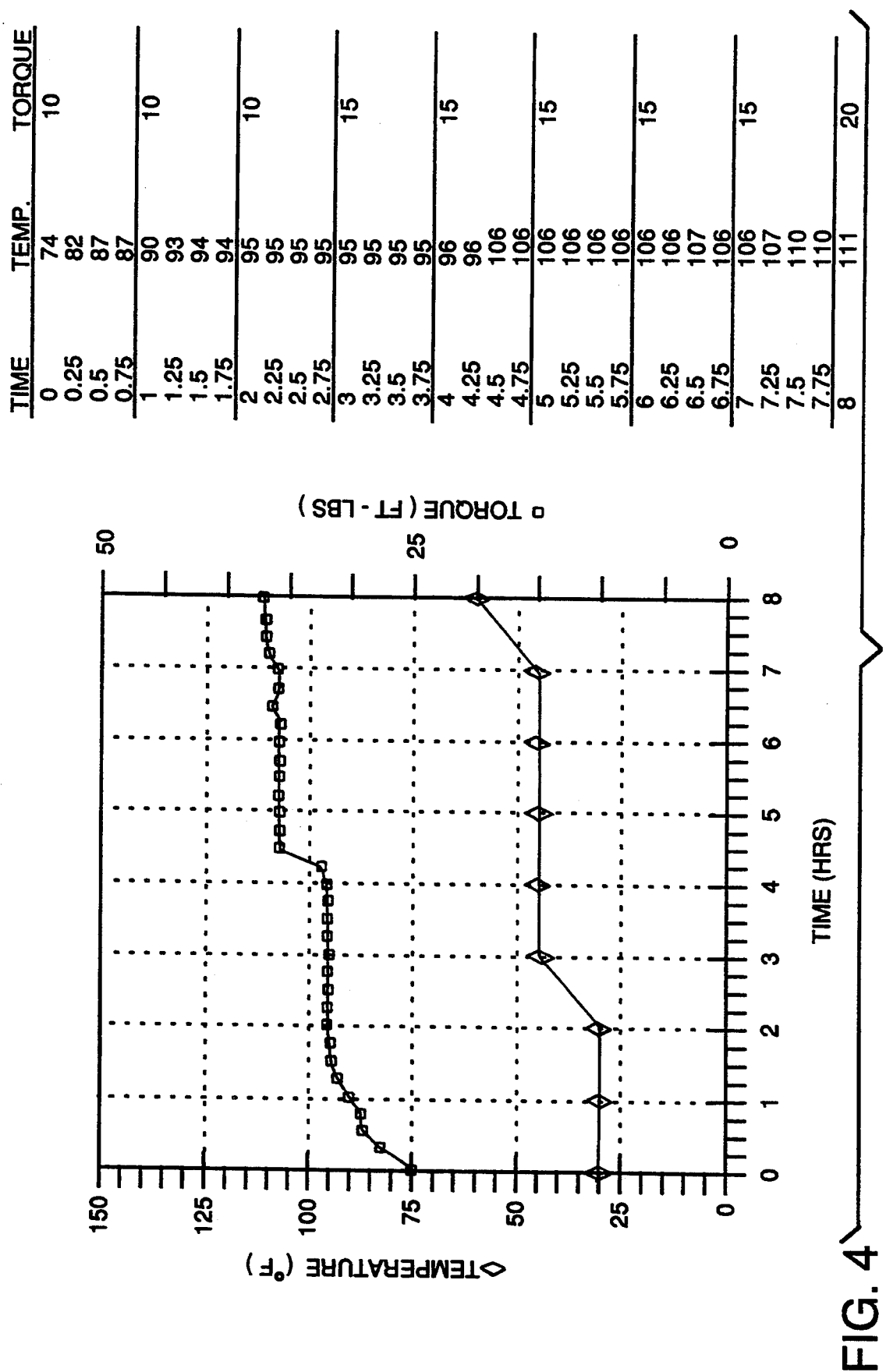
FIG. 4 is a chart showing the results of testing conducted on the swivel hardware assembly of the present invention.

Test numbers 11 and 12 on the foregoing chart utilized the swivel hardware assembly of the present invention. FIGS. 3 and 4 illustrate the results of tests numbered 11 and 12 on the foregoing chart. One line shows the temperature at progressive time intervals while the other line shows the torque in ft-lbs at progressive time intervals.

Even the hardware configurations utilizing a single self lubricating washer did not perform as well as the pair of self lubricating washers. The present invention showed superior performance consistency and temperature and torque stability over the duration of the tests.

Whereas, the present invention has been described in relation to the drawings attached hereto, it should be understood that other and further modifications, apart from those shown or suggested herein, may be made within the spirit and scope of this invention.

What is claimed is:

1. A swivel hardware assembly which comprises:
   a first load fitting having a base and a circular bore opening therethrough;
   a second load fitting having a shank passing through said base terminating in a head to form a pivotal connection between said first and said second fitting; and
   two thrust washers juxtaposed between said base and said head, said thrust washers having opposed self lubricating surfaces forming a single bearing surface.

2. A swivel hardware assembly as set forth in claim 1 wherein said self lubricating surfaces include a layer of polytetrafluoroethylene.

3. A swivel hardware assembly as set forth in claim 1 wherein said opposed self lubricating surfaces each include a layer of bronze powder impregnated with a mixture of polytetrafluoroethylene and lead.

4. A swivel hardware assembly which comprises:
   a bail having a base with an opening therethrough;
   a shank terminating in a head, said shank passing through said opening to form a pivotal connection between said bail and said shank;
   a first thrust washer juxtaposed between said head and said base; and
   a second thrust washer juxtaposed between said head and said base, each said thrust washer having at least one surface covered with a self lubricating material, said self lubricating surfaces mating with each other to form a bearing surface.

5. A swivel hardware assembly as set forth in claim 4 wherein said self lubricating material includes a layer of polytetrafluoroethylene.

6. A swivel hardware assembly as set forth in claim 4 wherein each said thrust washer is composed of steel and wherein each said self lubricating surface includes a layer of bronze powder or bronze alloy impregnated with a mixture of polytetrafluoroethylene and lead covered with an exterior layer of polytetrafluoroethylene and lead.

7. A swivel hardware assembly as set forth in claim 4 wherein said self lubricating surfaces are flat and mate flush with each other.

* * * * *